US005558781A

United States Patent [19]

Buchold et al.

[11] Patent Number: 5,558,781

[45] Date of Patent: Sep. 24, 1996

[54] PROCESS FOR ENZYMATICALLY DEGUMMING VEGETABLE OIL

[75] Inventors: Henning Buchold, Hanau; Rudolf Boensch, Neckenheim; Joerg Schroeppel, Frankfurt, all of Germany

[73] Assignees: Metallgesellschaft Aktiengesellschaft, Franfurt am Main; Rohm GMBH Chemische Fabrik, Darmstadt, both of Germany

[21] Appl. No.: 340,829

[22] Filed: Nov. 16, 1994

[30] Foreign Application Priority Data

Nov. 19, 1993 [DE] Germany .......................... 43 39 556.2

[51] Int. Cl.[6] .................................................. B01D 61/58

[52] U.S. Cl. .......................... 210/805; 210/651; 210/806

[58] Field of Search .................................... 426/655, 601, 426/417; 210/805, 634, 708, 724, 806, 804, 651

[56] References Cited

U.S. PATENT DOCUMENTS 4,399,224 8/1983 Flider et al. ............................ 435/271

FOREIGN PATENT DOCUMENTS 0122727 5/1987 European Pat. Off. .
0513709 11/1992 European Pat. Off. .
0622446 11/1994 European Pat. Off. .
2411531 9/1974 Germany .
1190096 4/1970 United Kingdom .

OTHER PUBLICATIONS

Roempp Chemie–Lexicon, 9th ED., vol. 6, pp. 4777 to 4778.
Fat Science Technology, vol. 95, No. 8, pp. 300–304 (1993).
Database WPI:JP A 52096790; Aug. 13, 1977.
Biochemical Engineering and Biotechnology Handbook, pp. 51–55 (1983).
Biotechnology Vch, vol. 2, pp. 663–665, 1985.
Agric. Biol. Chem. 51(1),pp. 37–45 (1987).
Database WP JP Jun. 13, 1990.

*Primary Examiner*—Frank Spear
*Attorney, Agent, or Firm*—Herbert Dubno

[57] ABSTRACT

A process is disclosed for enzymatically degumming vegetable oil where the vegetable oil to be degummed is adjusted to a pH from 3 to 6 and is mixed with an aqueous enzyme solution, which contains one of the enzymes phospholipase A1, A2 or B. In a degumming reactor the enzymes are permitted to act on the oil at temperatures from 20° to 90° C. with stirring. Before or after a separation of the degummed oil a separation promoter or a solubilizer is added at temperatures from 20° to 90° C. to the liquid which has been withdrawn from the degumming reactor. A substantially sludgefree solution, which contains used enymes, is thus recovered and is recycled at least in part to a location preceding the degumming rector. The content of recycled used enzymes in the total amount of the enzymes dispersed in the oil is at least 10%.

10 Claims, 2 Drawing Sheets

PROCESS FOR ENZYMATICALLY DEGUMMING VEGETABLE OIL

FIELD OF THE INVENTION

This invention relates to a process for enzymatically degumming vegetable oil. More particularly, the pH of the vegetable oil to be degummed is adjusted to a level of 3 to 6, an aqueous enzyme solution which contains at least one of the enzymes phospholipase A1, A2 or B is dispersed in the vegetable oil, these enzymes are permitted to degum the oil at temperatures of 20° to 90° C. in a degumming reactor under stirring, and then the degummed vegetable oil is separated from a liquid which has been withdrawn from the degumming reactor.

BACKGROUND OF THE INVENTION

A process to enzymatically degum vegetable oil is disclosed in EP-A-0 513 709. However, the reference provides no detail showing how the used phospholipase enzymes can be recovered after the vegetable oil has been degummed. A somewhat different process to degum edible oils is disclosed in EP-3-0 122 727 in which hydrolyzed phosphatides are employed. In such a process phosphatides, such as lecithin, can be recovered and recycled to an earlier point in the process.

OBJECT OF THE INVENTION

It is the object of the invention to provide a process for enzymatically degumming vegetable oil wherein the enzymes used in the degumming process are re-used at least in part in the degumming process.

SUMMARY OF THE INVENTION

This object is obtained according to the presently disclosed process for degumming vegetable oil, which comprises the steps of:

(a) adjusting the pH of the vegetable oil with an aqueous acid to a value of 3 to 6 to obtain a vegetable oil-water emulsion;

(b) dispersing throughout the vegetable oil-water emulsion an aqueous enzyme solution which contains at least one of the enzymes phospholipase A1, A2 or B to enzymatically degum the vegetable oil;

(c) stirring the vegetable oil-water emulsion to facilitate enzymatic degumming of the vegetable oil at a temperature of 20° to 90° C. to obtain a liquid which contains degummed vegetable oil and a watery sludge containing said phospholipase enzymes which were used during step (b) and which are adsorbed on a phosphatide sludge;

(d) separating the degummed vegetable oil from the watery sludge which contains said phospholipase enzymes which were used during step (c) and which are adsorbed on said phosphatide sludge to obtain degummed vegetable oil and a water-sludge phase containing said used phospholipase enzymes adsorbed on said phosphatide sludge;

(e) adding a separation promoter to said water-sludge phase following step (d) to promote separation of the used enzymes from the phosphatide sludge by desorption, and separating an aqueous solution of said used phospholipase enzymes from said phosphatide sludge to form a sludge-free aqueous solution containing the used phospholipase enzymes or (e1) adding a solubilizer to said watery sludge before step (d) or to said water-sludge phase following step (d) to solubilize said phosphatide sludge thereby also forming a sludgefree aqueous solution containing the used phospholipase enzymes;

(f) recovering the sludge-free aqueous solution containing the used phospholipase enzymes from step (e) or step (e1); and (g) recycling at least in part to step (b) said aqueous solution containing the used phospholipase enzymes wherein said aqueous solution is dispersed throughout a fresh supply of the vegetable oil to be degummed according to step (c), and wherein the content of recycled used phospholipase enzymes in the total amount of phospholipase enzymes dispersed in the vegetable oil is at least 10%.

According to the invention a separation promoter or a solubilizer is added to the liquid withdrawn from the degumming reactor at temperatures from 20° to 90° C. before or after the degummed oil is separated and a substantially sludgefree aqueous solution, which contains used enzymes is recovered. The aqueous solution containing the used phospholiphase enzymes is recycled at least in part to a location preceding the degumming reactor and is dispersed in the oil that is to be degummed, wherein the content of recycled used enzymes in the total amount of enzymes dispersed in the oil is at least 10%. To save costs, the content of recycled used enzymes in the total of the enzymes dispersed in the oil is desirably at least 20% or more, preferably at least 50%.

The liquid which has been withdrawn from the degumming reactor contains degummed oil. If the degummed oil is separated from that liquid, e.g. in a centrifuge, a water-sludge phase which contains the used enzymes will be recovered at the same time. Two routes may be followed to prepare said enzymes for re-use:

1st route: A separation promoter is dispersed in the water-sludge phase at a temperature in the range from 20° to 90° C. The dispersion is stirred in a holding vessel and a substantially sludge free phase which contains the used enzymes is separated from the sludge-containing liquid, e.g., by filtration. All or part of that aqueous phase is recycled to a location preceding the degumming rector and is dispersed in the oil that is to be degummed.

2nd route: A solubilizer is added to the water-sludge phase at a temperature in the range from 20° to 90° C. with stirring to form a substantially sludgefree aqueous solution which contains the used enzymes. All or part of that solution is recycled to a location preceding the degumming rector and is mixed with the oil that is to be degummed. The solubilizer inhibits a precipitation of phosphatide-containing sludge with adsorbed enzymes.

The second route can be modified in that a solubilizer is added to the oil-containing liquid containing watery sludge coming from the degumming rector and the degummed oil is subsequently separated from the liquid, e.g., in a centrifuge. In that case the degummed oil is recovered as well as a substantially sludge-free aqueous phase, which contains the used enzymes. All or part of that aqueous phase may be recycled without a further treatment to a location preceding the degumming reactor and may be mixed with the oil which is to be degummed.

The following substances or mixtures of substances may be used as a separation promoter or as a solubilizer:

a) Polyethylene-sugar-fatty acid esters, particularly TWEEN 20 to TWEEN 85 (produced by DuPont);

b) ricinus ethoxylate;

c) ethoxylated palmitate;

d) ethoxylated synthetic primary alcohol, which alcohol preferably contains 9 to 12 carbon atoms per molecule and contains, e.g., 12 ethoxyl groups;

e) ethoxylated lauryl alcohol, e.g., with 11 ethoxyl groups;

f) ethoxylated tallow fatty alcohol, e.g., with 25 ethoxyl groups; or g) non-ionic surfactant, e.g., SPAN 40 or SPAN 80 (produced by ICI).

Additionally, the following substances may be used as separation promoters:

h) Anion-active compounds, particularly
  h1) hot water-soluble methyl celluloses: or
  h2) hot water-soluble carboxymethylcelluloses;

i) nonionic compounds, particularly
  i1) polysaccharides, e.g. water-soluble starch;
  i2) xerogels, e.g., agar-agar or hydrolyzed gelatine;
  i3) biopolymers, particularly alginates or chitosans.

The amount in which the solubilizer or separation promoter is used may be varied in a wide range and is in most cases between 0.1 and 100 g per liter of liquid. A surplus of solubilizer or separation promoter will not be disturbing.

For a degumming of the edible oils with the aid of enzymes it is desirable first to pre-degum the oil with water in order to recover lecithin. Because lecithin in the oil is attacked by the phospholipases A1, A2, or B, it is desirable to decrease the phosphorus content of the oil to a range of 50 to 500 ppm by a pre-degumming, e.g. with water. That pretreatment is mainly recommended for high-lecithin oils, such as soybean oil.

BRIEF DESCRIPTION OF THE DRAWING

The above and other objects, features, and advantages will become more readily apparent from the following description, reference being made to the accompanying drawing in which.

DETAILED DESCRIPTION OF THE DRAWINGS

Figure 1:
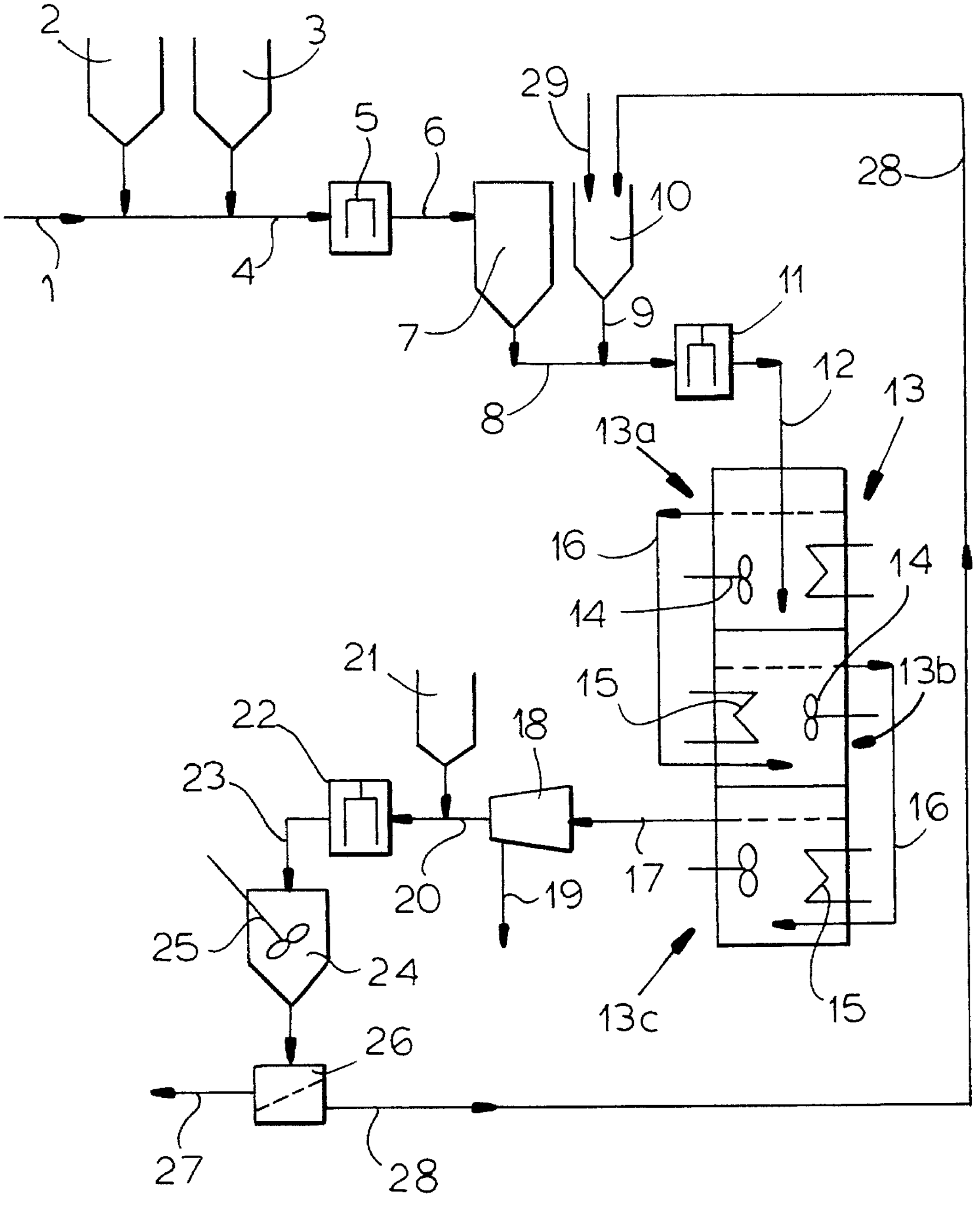
FIG. 1 is a flow diagram showing an embodiment of the process in which a separation promoter is added.

In accordance with FIG. 1 the vegetable oil which is to be entirely degummed comes from a line 1. The oil is first supplied at a metered rate with an acid aqueous solution, such as citric acid, from the supply tank 2, and subsequently with an alkaline aqueous solution, such as sodium hydroxide solution from the supply tank 3, at such rates that the oil has a pH from 3 to 6, preferably of about 5, as it is fed through a line 4 to a first dispersing unit 5. An oil-water emulsion is formed in the dispersing unit 5 and is fed through a line 6 to a holding vessel 7.

After a residence time in the range from 1 to 30 minutes the emulsion flows through the line 8 to a junction 9 where an aqueous enzyme solution coming from the supply tank 10 is added. 10 to 100 mg enzyme solution are added per liter of oil. The enzymes which are dissolved in water are the phospholipases of type A1, A2 or B, and the solution has an activity of e.g., 10,000 lecitase units per milliliter. The enzyme containing oil is passed through a further dispersing unit 11 and is subsequently conducted in line 12 to a degumming reactor 13. The reactor 13 consists of 1 to 5 storeys. Each storey comprises a stirrer 14 and a heater 15. Adjacent storeys are interconnected by a communicating line 16. The reactor 13 shown in the drawing comprises three storeys 13*a*, 13*b*, and 13*c*, through which the oil flows from top to bottom with given residence time in each storey. Different treating temperatures can be adjusted in each storey. It is recommendable to use the lowest temperature in the uppermost storey 13*a* and the highest temperature in the lowermost story 13*c*. The treating temperatures in the reactor 13 are in the range from 20° to 90° C. and the total residence time in the reactor 13 is usually from 3 to 5 hours.

The treated oil leaves the degumming reactor 13 through the line 17 and is supplied to a centrifuge 18. Degummed oil is recovered as a product in the centrifuge and is discharged in line 19. Separation promoter from the supply tank 21 is added to the enzyme-containing aqueous sludge phase flowing in line 20, and the resulting mixture is intensely stirred in the dispersing unit 22. The stirred phase is then supplied in line 23 to a holding vessel 24, which is preferably provided with a stirrer 25. The temperatures in the holding vessel 24 are in the range of 30° to 85° C., preferably at about 60° C., and the residence time therein is in the range of 3 to 60 minutes. Under the action of the separation promoter the enzymes adsorbed on the phosphatide sludge are desorbed and transferred to the water phase. To separate the enzyme-containing water phase the liquid from the holding vessel 24 is supplied to filtering means 26, in which a microfiltration is preferably effected. Alternatively, a centrifuging step may be carried out here. As a result, the phosphatide sludge is separated and is carried off in line 27. The aqueous phase which contains the used enzymes is withdrawn in line 28 and is supplied to the supply tank 10 for re-use. Any fresh enzyme solution which is required comes from line 29. In that way the used enzymes can be re-used to degum the oil so that the operating costs of the process can very considerably be reduced.

Figure 2:
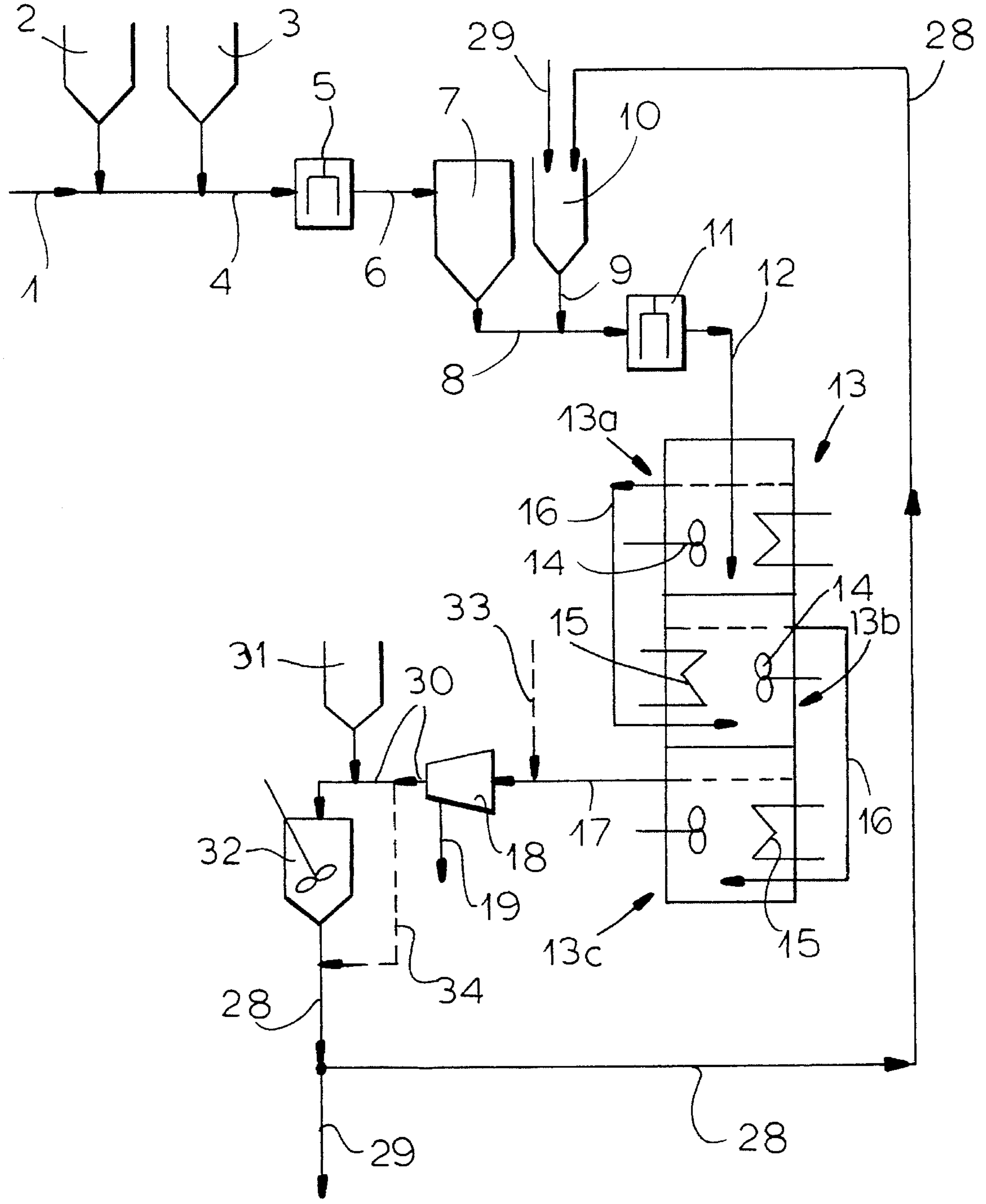
FIG. 2 is a flow diagram showing an embodiment of the process in which a solubilizer is added.

Between lines 1 and 17, the process illustrated in FIG. 2 agrees with the process described hereinbefore with reference to FIG. 1. Also in accordance with FIG. 2 the mixture of water, phosphatide sludge and oil coming from the degumming reactor 13 is fed in line 17 to the centrifuge 18, from which degummed oil is withdrawn in line 19. Solubilizer from the supply tank 31 is added to the enzyme-containing water-sludge phase in line 30 and the resulting mixture is stirred in the holding vessel 32. The resulting enzyme-containing aqueous solution is recycled in line 28 to the supply vessel 10 for re-use. Surplus solution may be removed in line 29. The holding vessel 32 may be replaced by a dispersing unit 22, see FIG. 1.

In an alternative, the solubilizer may be added in the process of FIG. 2 through the line 33 represented by a broken line to the mixture of water, sludge and oil flowing in line 17 at a location preceding the centrifuge 18. In that case the centrifuge serves also as a mixer and degummed oil in line 19 and an enzyme-containing aqueous solution is withdrawn from the centrifuge 18. All or part of the latter solution is recycled through lines 30, 34 and 28 to the supply tank 10 for re-use. In that variant of the process the supply tank 31 and the holding vessel 32 can be omitted.

EXAMPLES

In a laboratory apparatus which corresponds to that shown in the drawing and comprises a single-stage reactor 13, rapeseed oil which has been predegummed with water is degummed with enzymes in various ways. Examples 1, 5, and 6 are control examples, in which the process in accordance with the invention is not adopted.

Example 1 (Comparative Example)

54 ml of an aqueous solution of 10% citric acid are added to 6 liters of predegummed rapeseed oil at 60° C. and 48 ml of an aqueous solution of 5% NaOH are added to adjust the pH to 5.0. After a residence time of 30 minutes, 205 ml of an aqueous solution of phospholipase A2, which contains 3800 lecitase units, are added to the reaction mixture. After a treatment for 5 hours at 60° C. with intense mixing a water oil emulsion is separated by a centrifuge 18 into an oil phase and a water-sludge phase. The degummed rapeseed oil in line 19 has a residual phosphorus content of 6 ppm and has a volume of 370 ml. The phosphorus content is a measure of the degree of degumming; effectively degummed oil contains less than 10 ppm residual phosphorus.

Example 2

Example 1 is repeated for carrying out the process in accordance with the invention as shown in FIG. 2. 3 g/l TWEEN 80 are added to the water-sludge phase in line 30 and the liquid is intensely stirred in a dispersing unit (Ultra-Turrax) for 10 minutes. The resulting enzyme-containing solution is free of sludge and does not contain suspended particles and is recycled through line 28 to the supply tank 10. Fresh enzymes are not added. The degummed oil in line 19 contains 5 ppm residual phosphorus.

Example 3

Example 1 is repeated for carrying out the process in accordance with the invention as shown in FIG. 2. TWEEN 80 is added to the liquid mixture leaving the enzyme reactor in line 17 at a rate of 2.5 g per liter of the mixture. The mixture is separated in the centrifuge 18. The resulting enzyme-containing solution is substantially free of sludge and is supplied through lines 34 and 28 to the supply tank 10. No fresh enzymes are added. The degummed oil in line 19 contains 5 ppm residual phosphorus.

Example 4

Example 1 is repeated for carrying out the process in accordance with the invention as shown in FIG. 1.

2 g TWEEN 80 (produced by DuPont) are added to the water-sludge phase in line 20 per liter of that phase and the liquids are homogenized in a dispersing unit (Ultra-Turrax) 22. After a residence time of 10 minutes the phosphatide sludge is separated from the aqueous enzyme solution by centrifugation. The enzyme solution is recycled through line 28 to the supply tank 10. No fresh enzyme solution is added. The degummed oil flowing in line 19 contains 5 ppm residual phosphorus.

Example 5 (Comparative Example)

In a modification of Example 4, the phosphatide sludge which has been pretreated with TWEEN 80 and obtained after the centrifugation is recycled from line 27 to the metering junction 9 with the oil flowing in line 8. It is found that that phosphatide sludge cannot improve the degumming because it has no enzyme activity, and is thus no substitute for the used enzymes recycled through line 28 according to the invention.

Example 6 (Comparative Example)

Example 4 is repeated without the recycling of the aqueous enzyme solution in line 28. The phosphatide sludge in line 27 is resuspended in distilled water and is homogenized at 60° C. in a dispersing unit (Ultra-Turrax) for 10 minutes. Thereafter the sludge phase is separated by centrifugation and the aqueous phase recovered at the same time is recycled to metering junction 9. No fresh enzyme solution is added. After a treatment for 5 hours, the rapeseed oil is found to contain 49 ppm residual phosphorus. This proves that no enzymes had been recovered from the phosphatide sludge conducted in line 27.

Example 1 is repeated for carrying out the process in accordance with the invention. 2 g of the alginate Protan (produced by Pronova-Biopolymer, Norway) are added to the water-sludge phase conducted in line 20 per liter of that phase and the liquids are homogenized in a dispersing unit (Ultra-Turrax) 22, see FIG. 1. After a residence time of 10 minutes the phosphatide sludge is separated by centrifugation from the aqueous enzyme solution. The enzyme solution is recycled to the supply tank 10. No fresh enzymes are added and the degummed oil conducted in line 19 contains 8 ppm residual phosphorus. The same result is produced with 2 g/l hydrolyzed gelatine (produced by Gibco, Scotland). When 2 g/l water-soluble starch (produced by Merck Germany) are used as a separation promoter, the degummed oil contains 2 ppm residual phosphorus.

What is claimed is:

1. A process for degumming vegetable oil, which comprises the steps of:

(a) adjusting the pH of the vegetable oil with an aqueous acid to a value of 3 to 6 to obtain a vegetable oil-water emulsion;

(b) dispersing throughout the vegetable oil-water emulsion an aqueous enzyme solution which contains at least one of the enzymes phospholipase A1, A2 or B to enzymatically degum the vegetable oil;

(c) stirring the vegetable oil-water emulsion to facilitate enzymatic degumming of the vegetable oil at a temperature of 20° to 90° C. to obtain a liquid which contains degummed vegetable oil and a watery sludge containing said phospholipase enzymes which were used during step (b) and which are adsorbed on a phosphatide sludge;

(d) separating the degummed vegetable oil from the watery sludge which contains said phospholipase enzymes which were used during step (c) and which are adsorbed on said phosphatide sludge to obtain degummed vegetable oil and a water-sludge phase containing said used phospholipase enzymes adsorbed on said phosphatide sludge;

(e) adding a separation promoter selected from the group consisting of a polyethylene-sugar-fatty acid ester, ricinus ethoxylate, ethoxylated palmitate, an ethoxylated synthetic primary alcohol, an ethoxylated tallow fatty alcohol, a non-ionic surfactant, a hot water-soluble methyl cellulose, a hot water-soluble carboxymethylcellulose, a water-soluble starch, a xerogel, an alginate and a chitosan to said water-sludge phase following step (d) to promote separation of the used enzymes from the phosphatide sludge by desorption, and separating an aqueous solution of said used phospholipase enzymes from said phosphatide sludge to form a sludge-free aqueous solution containing the used phospholipase enzymes or (e1) adding a solubilizer selected from the group consisting of a polyethylene-sugar-fatty acid ester, ricinus ethoxylate, ethoxylated palmitate, an ethoxylated synthetic primary alcohol, an ethoxylated tallow fatty alcohol, and a non-ionic surfactant to said watery sludge before step (d) or to said water-sludge phase following step (d) to solubilize said phosphatide sludge thereby also forming a sludge-free aqueous solution containing the used phospholipase enzymes;

(f) recovering the sludge-free aqueous solution containing the used phospholipase enzymes from step (e) or step (e1); and (g) recycling at least in part to step (b) said aqueous solution containing the used phospholipase enzymes wherein said aqueous solution is dispersed throughout a fresh supply of the vegetable oil to be degummed according to step (c), and wherein the content of recycled used phospholipase enzymes in the total amount of phospholipase enzymes dispersed in the vegetable oil is at least 10%.

2. A process according to claim 1, wherein degummed oil is separated from the liquid which has been withdrawn from the degumming reactor and a water-sludge phase is thus recovered, a separation promoter is dispersed in said water-sludge phase at temperatures in the range from 20° to 90° C., the water-sludge phase is stirred in a holding vessel, a substantially sludge-free aqueous phase which contains used enzymes is separated from the water-sludge phase which has been stirred, and at least part of said substantially sludge-free phase is recycled to a location preceding the degumming reactor.

3. A process according to claim 1, wherein degummed oil is separated from the liquid which has been withdrawn from the degumming reactor and a water-sludge phase is thus recovered, a solubilizer is added to said water-sludge phase at temperatures in the range from 20° to 90° C., a substantially sludge-free aqueous solution which contains used enzymes is produced with stirring and is recycled at least in part to a location preceding the degumming reactor.

4. A process according to claim 1, wherein solubilizer is added to the liquid which has been withdrawn from the degumming reactor, the liquid is passed through a separator, degummed oil and a substantially sludge-free aqueous solution which contains used enzymes are separately recovered and at least part of the solution is recycled to a location preceding the degumming reactor.

5. A process according to claim 1, wherein the separation promoter or the solubilizer is added at a rate of 0.1 to 100 g per liter of the liquid.

6. A process according to claim 1, wherein the content of used enzymes in the total amount of enzymes dispersed in the oil which is to be degummed is at least 20%.

7. The process defined in claim 1 wherein according to step (e) the ethoxylated synthetic primary alcohol employed as the separation promoter contains 9 to 12 carbon atoms and 12 ethoxyl groups per molecule.

8. The process defined in claim 1 wherein according to step (e) the ethoxylated synthetic primary alcohol employed as the separation promoter is lauryl alcohol ethoxylated with 11 ethoxyl groups.

9. The process defined in claim 1 wherein according to step (e1) the ethoxylated synthetic primary alcohol employed as the solubilizer contains 9 to 12 carbon atoms and 12 ethoxyl groups per molecule.

10. The process defined in claim 1 wherein according to step (e1) the ethoxylated synthetic primary alcohol employed as the solubilizer is lauryl alcohol ethoxylated with 11 ethoxyl groups.

* * * * *